United States Patent Office 3,478,817
Patented Nov. 18, 1969

3,478,817
ENVIRONMENTAL SPACE CONDITIONING CHAMBER
Allan Shaw, Myrtle Bank, South Australia, Australia
Filed Apr. 18, 1966, Ser. No. 543,352
Claims priority, application Australia, Apr. 13, 1966, 57,747/66
Int. Cl. F24f 3/14; G05d 22/00
U.S. Cl. 165—21                                    19 Claims

ABSTRACT OF THE DISCLOSURE

A controlled chamber is described in which humidity and temperature are independently controlled, the control means being such as to react to changes in the conditions within the chamber and in such a manner as to maintain substantially constant the total load upon a cooling system associated with the chamber.

---

Figure 1:
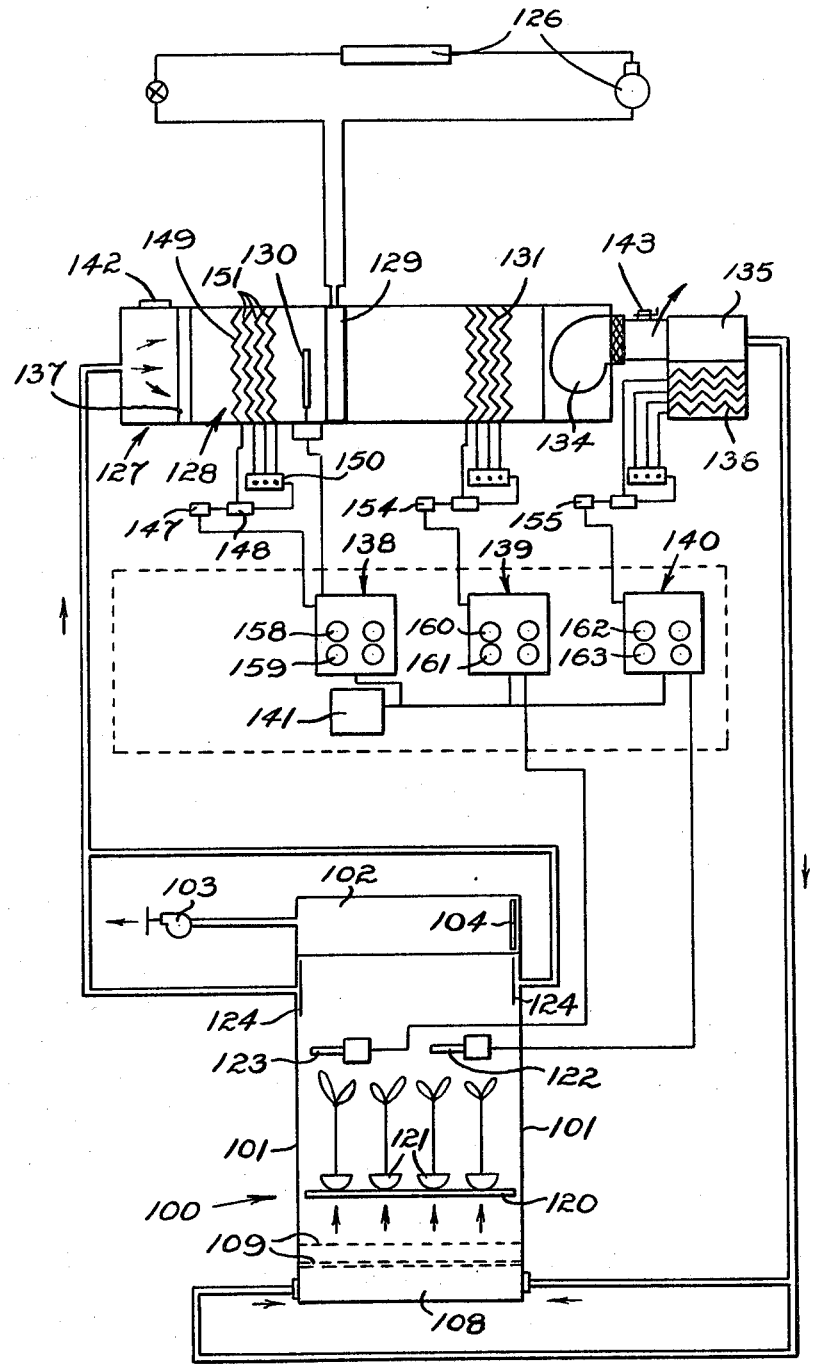

This invention relates to a controlled chamber, that is, a space defined by boundaries within which the properties of dry bulb temperature and dew point temperature can be controlled over a range of settings.

Controlled chambers have been used heretofore to a large extent for plant growth studies, and when used as such are herein termed "phytotrons." However controlled chambers extend to include chambers for both the control and the testing and rating of performance, and are for example used by space scientists, physicists, building scientists, biologists, zoologists, geneticits and engineers. For example they may be used for a controlled animal house, or a space suit using oxygen and water vapor mixtures at low pressures, or for the testing of expansion coils or electronic equipment and with this invention if desired in these uses the controlled settings can be subjected to periodic variations.

This invention is applicable to "chambers" in the broadest sense of the term; the chamber may be an insulated section of duct work, a room, a series of rooms, an animal house, a space suit, a space capsule, a calorimeter or the like.

The application of this invention extends to the general phenomena of heat and mass transfer of any gas and any vapor mixture (including the limiting cases wherein the gas content or vapor content approaches zero) and is not necessarily confined to air/water vapor mixtures.

This invention is applicable to any mixture pressure and is not necessarily confined to barometric pressure at sea level.

Phytotrons and similar chambers have been required to meet numerous specifications of the users. These specifications vary widely from narrow to wide range operating settings; from temperature only to simultaneous temperature and humidity settings; from a single fixed operating condition to an operating condition which automatically changes over to simulate both day and night conditions or other periodicity programming arrangements; from a one hundred percent recirculating system with carbon dioxide injection to systems specifying a fixed percentage of fresh air and spill; from systems operating to broad tolerances to systems requiring close tolerances with minimal deviation between points within the plant occupied space; from systems that are set up laboriously with long periods required for manual adjustment to quick start automatic systems.

Heretofore phytotrons and similar chambers have been operated by systems which have not been able to economically meet the requirements of the users. They have failed to function properly when wide ranges of operating settings were specified, when automatic change-over between day and night operating settings was specified, when control of both dry bulb and dew point temperature was specified, when fresh air introduced from the outside of the chamber was specified, when close tolerance control was specified, or when automatic start-up procedure was specified.

Existing systems have failed to meet the needs of the agronomist and scientist. This failure has increased as these demands have become more refined. The result has been the use of expensive complex systems, unstable in performance and frequently requiring the attention of skilled operators and loss of considerable time to set up and to maintain conditions within desired limits.

The main object of this invention is to provide a controlled chamber which is more economical and stable than heretofore in meeting the user's specifications.

The invention may be said to consist of a controlled chamber including a fan to draw a gas, vapor or gas/vapor mixture through the chamber, a condenser and evaporator unit containing refrigerant and operable on a refrigeration cycle having a cooled heat exchange surface in the path of flow of the gas, vapor or gas/vapor mixture, heating means in said path, and control means, characterized in that said control means are responsive to true load changes and that the total loads on the refrigeration system are maintained substantially constant for each control set point.

This invention is capable of providing a simpler economically feasible system of engineering for a controlled chamber which will be capable of maintaining the chamber to the desired limits of temperature and humidity conditions (each or together) and within the desired range (narrow or broad) even though the mixture controlled is subject to random rates of heat and mass transfer.

The invention can also provide control means, if desired, to automatically change the temperature and humidity according to some desired program, thus permitting automatic periodicity control within a range of settings.

This further feature is desirable when the chamber is to be used as a phytotron for the study of plant growth. The desired change for a phytotron is to pass between simulated "day" and "night" conditions.

This further feature if desired, when it is used as a means to control the inlet conditions of gas vapor mixtures to heat and mass transfer surfaces for the purpose of testing and rating of performance, may be combined with additional programming facilities. For example, when the chamber is to be used for testing and the rating of the performance of direct expansion coils, the automatic periodicity control if desired may not only take the form of varying the temperature and humidity of the gas/vapor mixture at the inlet to the direct expansion coil placed in the chamber but may include the varying of the capacity of the compressor or varying automatically the constant rate of gas/vapor flow. Thus test data could be indicated or recorded downstream of the direct expansion coil, giving the coil performance not only at a standard condition but over a wide range of operating conditions.

I have found that this invention can be best described by introducing a division of the "total loads" on the refrigeration system into "true loads" and "non-true loads."

It is possible to devise an engineering system wherein the controls are responsive to true load changes only, and to arrange total loads on the refrigeration system to be substantially constant. The characterizing feature of this invention is therefore, as said above, that the control means are responsive to true load changes and total loads are maintained substantially constant. If the non-true loads are held to a practical minimum, then great economies can be achieved. Every "non-true" load is a double "penalty" since it implies over-cooling and over-dehumidifying and requires equivalent reheating and humidifying, so that clearly it is most desirable to minimize the non-true load.

The true loads may be readily distinguished from the non-true loads in that the true loads are the loads directly associated with the internal conditions of the controlled chamber existant while it is operating. For example variation of heat transfer through the cabinet walls defining the boundary of the chamber, variation of heat from lights when these are used within the chamber, variation of water vapor quantities due to transpiration and evaporation from the leaves of plants and from plant watering when the device is used as a phytotron, and variations of temperature and mass transfer in the relatively small quantities of fresh air introduced when fresh air is specified by the user as may be the case in a phytotron. In contrast to this, the non-true loads may be regarded as the loads which are present due to the range requirement, the need if desired to control simultaneously both dry bulb and dew point temperatures, the limitations of the mechanical equipment of the systems employed including the automatic features required in the design, and the need to prevent frosting. All of these above non-true loads are substantially constant. Finally there is a variable portion of the non-true load brought in by the dry bulb and dew point temperature controllers to balance the random changes in the true load. Thus the total load on the refrigeration system is constant. The non-true load variations can be very large and non-true loads themselves can be very large. However, the true loads and the true load variations are usually relatively small. When the controlled chamber is used for the purpose of testing and rating performance of heat and mass transfer surfaces the true load variation and the true load are negligible.

Figure 2:
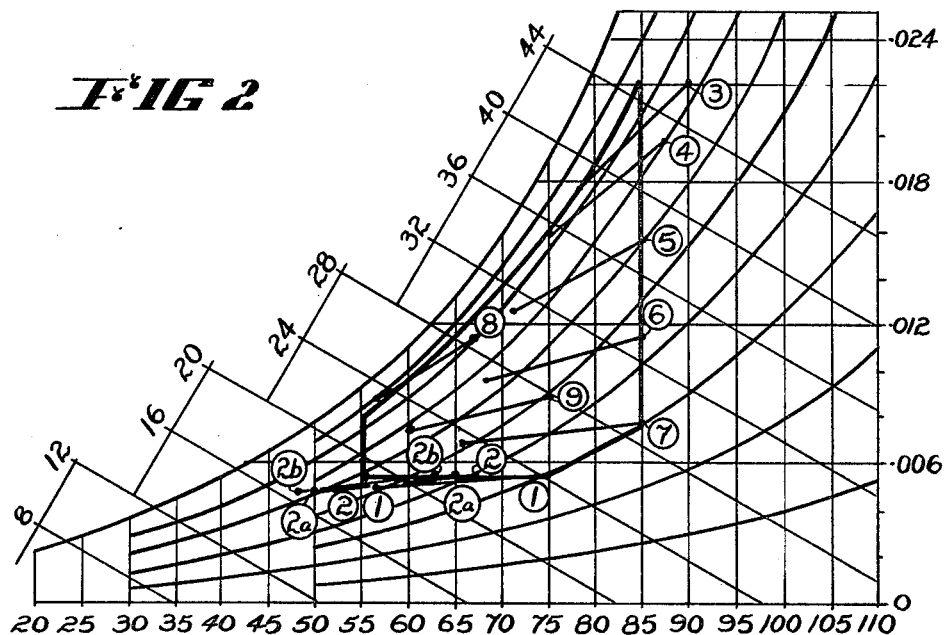
Figure 3:
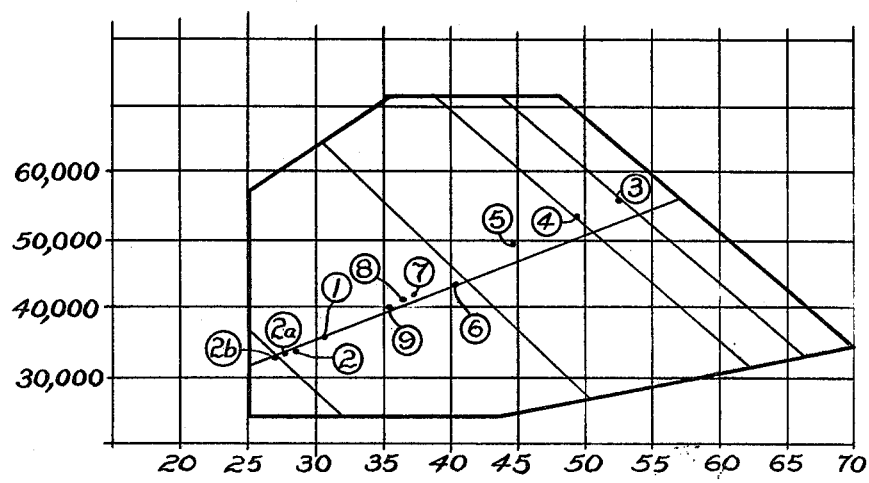
Figure 4:
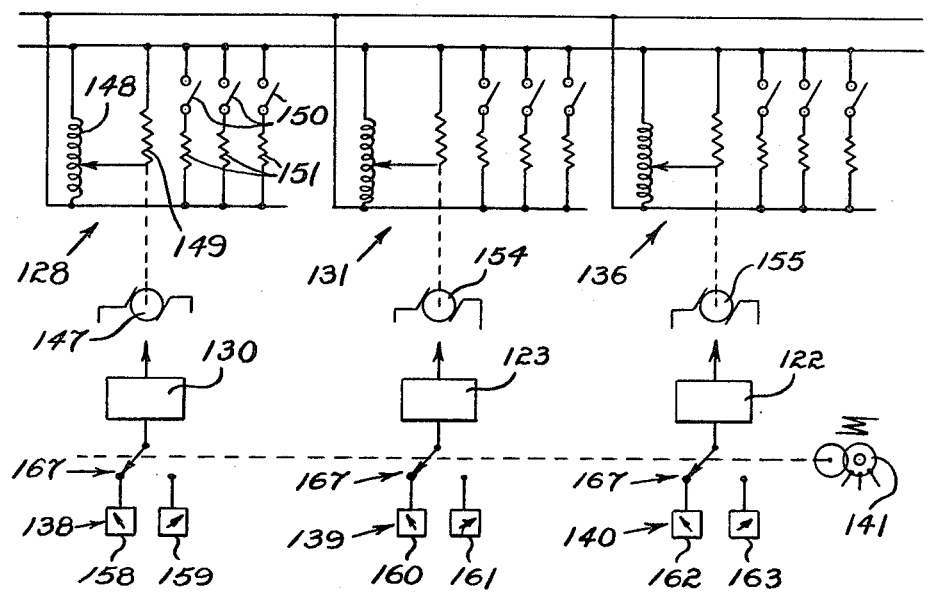
Figure 5:
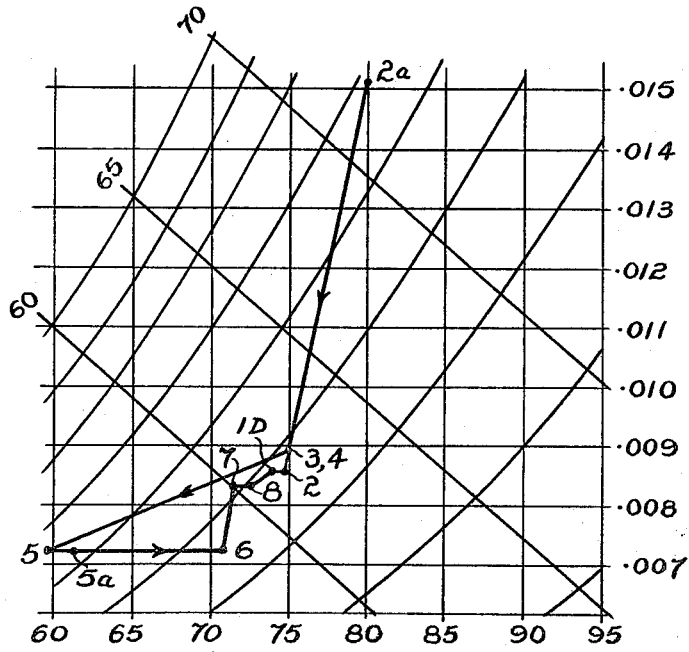

An embodiment of the invention is described hereunder in some detail with reference to and as illustrated in the accompanying drawings, in which:

FIG. 1 is a block diagram showing an environmental plant growth chamber (phytotron) including the engineering system servicing it, FIG. 2 is a psychrometric chart representing the performance of a particular fin-tube direct expansion coil for various entry conditions when operating at a fixed compressor speed under the conditions enumerated below in the section describing the steps taken to devise this engineering system so that the control means are reseponsive to true load changes only, and to eliminate variations in the total loads and to minimize the non-true loads, FIG. 3 is a graph showing the refrigeration cycle capacity versus evaporation temperature relation of the condensing unit and evaporator employed in this specific example. The diagonal lines moving up to the right represent the performance of the condensing unit, each line representing a particular compressor speed. The diagonal lines moving down to the right represent the performance of the evaporator, each line representing a constant entering enthalpy of the air/vapor mixture in B.t.u.'s per pounds mass of dry air to the evaporator coil. Capacity is in B.t.u. per hour units and temperature is in degrees Fahrenheit units. The data presented in FIG. 3 is valid when the air conditioning and refrigeration cycles are operated under the particular conditions enumerated below in the section describing the steps taken to make the total loads on the refrigeration system substantially constant, FIG. 4 is a simplified wiring diagram showing the basic interconnection of the electrical elements in this particular embodiment, and FIG. 5 is an air system cycle performance diagram for a random dry operating condition.

It will be appreciated immediately by those skilled in the art that a controlled chamber is more complex when it requires facilities to meet a wide range of operating conditions and where both temperature and humidity are controlled and where automatic change-over between day and night conditions are required and where close tolerances of control and automatic operation and rapid set-up of tests are specified.

According to this embodiment a phytotron (environmental growth chamber) comprises a cabinet 100 having insulated walls 101, a light section 102 across the top of the cabinet (which constitutes a chamber) containing a series of lights (not shown) which are ventilated by a ventilator fan 103 which drives air through the light section 102, drawing the air firstly through the filter 104.

The air passing up through the growth chamber goes through a turbulent flow path where it is thoroughly mixed in an air plenum 108 (at base of chamber), through perforated volume adjustable diffusers and plates 109 up to a point in its upward flow path below the plant occupied section of the chamber.

In the path across the plant occupied section a smooth uniform vertical displacement upward flow pattern is designed leading to the return air registers. The purpose is to prevent back flow effect from air that would result in convected heat directly below the light transferring to the plant occupied area. Thus the temperature difference across the plant occupied space is minimized. Furthermore eddies and non-uniformities of air movement resulting in large temperature differences between points within the plant occupied section are eliminated.

Heretofore there have been large differences in temperature and humidity within the plant occupied volume which made it difficult to maintain the space within close tolerance to the desired set points. Heretofore many agronomists have objected to upward flow air systems due to obstructions (plant platform, benches, servicing equipment, trays and pots), causing high uneven velocities and consequently wide temperature differences.

In this particular embodiment, application of this invention to artificially lighted plant growth chambers, an integrated engineering design of the air distributor eliminates these problems of upward flow.

All flat obstructions of the platform in the path of the air stream are eliminated, all structural members will be shaped or covered with fairings to prevent turbulence. All obstructing members will have their sizes minimized.

It is desirable to streamline and minimize the size of obstruction caused by the trays and pots 121, and also incorporate in the use of the trays and pots a unique design to allow for draining the pots with a vacuum pump or by gravity, or by either, providing the pots for an efficient test stand within and without the growth chamber.

The system involves the design of the structural member of the tray to serve as the drain trough of the pots or to further serve as the holding member of the pots and to further serve as a test stand outside the plant growth chamber and to further serve as a means to permit the streamlining of the base of the pots so that they are rounded and to further serve as a means to assure a symmetrical pattern in the face of the air stream. Furthermore the trays will be kept from overtuning or tilting by the special design of rollers which support them. The method used is as follows:

(1) The structural members supporting the pots are located on the centreline of the pot drain holes.

(2) The pots will have a rounded base (a molded pot is applicable in this particular application) terminating at its base with a tapered section. The pots may, if desired, have legs to be self-supporting on any flat surface, but this feature is not illustrated in the drawings.

The tapered conic section at the base of the pot will have a hole sized to the agronomist's requirements for drainage.

The male tapered section mates with a female tapered conic section located on the top of the hollow pipe tray construction. The incline of the taper is such as to mate the pot to the tray in a tight seal that is non-binding. This will assure easy removal of pots from the tray.

Each tray is rolled into place on a tray platform designed to hold the tray in position for proper pitch in direction of a platform drain trough and to prevent the tray from tipping while being withdrawn from the cabinet.

Each tray has a flexible connection at its front end permitting the water that has drained from the pot to flow into it by gravity and out of the system to a drain or permitting direct connection to a vacuum pump. The tray, on removal from the growth chamber, if desired serves as a test stand for the pots, including the draining feature described above.

The total assembly simplifies tray and platform design and eliminates to a minimum obstruction to upward flow movement.

A dew point sensor 122 and a dry bulb sensor 123 are disposed on a flexible connection within the cabinet 110 so that they can be moved to any point within the plant occupied space, and these signal the dew point control means and the reheat control means respectively. Air is withdrawn from the cabinet through a return air register 124 disposed at least on two sides of the cabinet just beneath the light section.

A condensing unit 126 serves an air conditioning unit 127 which also has walls defining a chamber, and is provided with a preheater 128 upstream of the direct expansion coil 129, the preheater 128 being constituted by a bank of directly heated electrical wires, and the temperature of the preheater is sensed by a dry bulb temperature sensing element 130. After the direct expansion coil 129 has been traversed by the circulating air and vapor mixture, the circulating mixture then passes a reheater 131 which again is constituted by a bank of directly heated wires.

Upon leaving the reheater the air is driven by the fan 134 past a pan humidifier 135 heated again by a bank of directly heated wires 136. A filter 137 is inserted in the circuit, a convenient locality being upstream from the preheater 128.

The controls for the air conditioning unit (including the humidifier) are constituted by a preheat control 138, a reheat control 139 and a dew point control 140. The preheat control, reheat control and the dew point control are associated with a day-night clock programmer 141.

In a phytotron it is desirable that a small quantity of fresh air be drawn in to replace a small quantity of circulating air which is allowed to spill out. In this embodiment the fresh air is drawn in through the manually preset vent 142 upstream of the filter 137, and a manually preset operated spill damper 143 downstream from the fan 134 regulates for a constant measured amount of circulating air discharged from the circuit.

The following steps were taken in operating the selected components of the system in order to have an air and refrigeration cycle which after start-up or change-over rapidly and automatically operates while at any selected setting to assume a steady flow state of equilibrium, a state where the dry bulb and dew point controllers are responsive only to true load changes and where the total load variations of the refrigeration system have been maintained substantially constant and where if the non-true loads are held to a practical minimum an economical system will result:

(1) The gas/vapor system has a constant volume air flow rate.

(2) The gas/vapor system inlet state to the direct expansion coil is constant.

(3) The refrigeration system has a constant condensing temperature.

(4) The temperature of the refrigerant in the evaporator is constant.

(5) The superheat setting downstream of the evaporator is constant.

(6) The compressor is continuously operating.

(7) There is full volume flow of the gas/vapor mixture through the evaporator (there is no by-pass of the evaporator).

(8) The system is provided with means to insure that frosting does not occur on the evaporator.

(9) The thermostatic expansion valve alone constitutes the only controller on the operation of the refrigeration cycle with the exception of the constant condensing temperature control mentioned in item 3 above. (There is no hot gas by-pass no back pressure control valves, no automatic unloading devices or compressor speed change while operating at a particular setting.)

(10) The system of air distribution through the plant occupied space of the environmental control chamber has a flow pattern that insures a uniform velocity, a uniform temperature and a uniform humidity ratio, and the air flow pattern minimizes the temperature difference across the plant occupied space by reducing the heat transferred from the light source into the plant occupied space.

The major control system schematic has no relation to the direct expansion coil or any other portion of the refrigeration system. The vapor compression refrigeration cycle operates freely. Based on preselection, for the desired range and conditions, the evaporator finds its steady state condition for each particular setting.

The preheat coil maintains sufficient load on the direct expansion coil to prevent the occurrence of frosting and may function to minimize the extent of excessive dehumidification. The preheater will not oeprate for every set point in the range, but only at those set points where frosting is to be prevented or where it is necessary to reduce the humidifying load.

The direct expansion coil in this embodiment is the exclusvie means by which the total load of the system is met. The system data for establishing the preset information for the operation of the controlled chamber is established from its performance within the framework of the engineering system selected and operated as indicated above. This preset information results in the system, if desired, being started up and operated by the operator merely setting a single switch in the "on" position.

The steps to select the direct expansion coil and to establish the preset conditions for the operator are as follows:

(1) The maximum of the design true loads must be determined. This is usually available from the user.

(2) The range of operation and all accessory requirements of the user must be determined.

(3) The design true loads must be related in terms of a dry bulb temperature rise and a humidity ratio rise for a constant mass flow of the gas/vapor mixture passing through the evaporator.

(4) A direct expansion coil must be selected having the lowest heat and mass transfer performance characteristic possible and yet be able to meet the design true loads at every operating condition within the range. This selection is based on a condensing unit operating at a fixed compressor speed and operating in the framework of the steps taken in operating the selected components of the system in order to have an air and refrigeration cycle which after start-up or change-over, rapidly and automatically operates while at any selected setting in the range to assume a steady flow state of equilibrium, a state wherein the dry bulb and dew point controllers are responsive only to true load changes and wherein the total load variations of the refrigeration system have been maintained substantially constant and where if the non-true loads are held to a practical minimum an economical system will result. These steps are described above. A psychrometric chart showing inlet and outlet conditions for a representative number of operating settings (inlet conditions) can be then be constructed. This is illustrated in FIG. 2.

(5) Corresponding to an analysis of a direct expansion coil performance of a representative number of operating settings within the range, the respective refrigerant temperatures within the evaporator and the condensing unit capacity can be determined. A graph showing refrigeration cycle capacity versus evaporator temperature can then be constructed for the particular compressor speed used in steps 4 and 5 above. This is illustrated in FIG. 3.

(6) The analysis of coil performance must then be repeated for a representative number of different compressor speeds.

This is a step in further minimizing the non-true load. FIG. 5 clearly illusrtates the size of the non-true load that may be present when the compressor speed (or other manual compressor capacity adjustment means) is the same for the complete range of required operating settings. FIG. 5 is an enlarged portion of a psychrometric chart. It represents the air conditioning cycle changes of state points for a random air inlet condition. Point number 9 in FIG. 2 was used for this purpose. FIG. 5 was constructed for a compressor speed which would remain fixed for all the operating state points within the range represented by the area enclosed in the borders of FIG. 2. The true load is related to the enthalpy difference between 8 and 1D of FIG. 5 (at localities 124 and 109 of FIG. 1) representing the internal loads of the controlled chamber plus the enthalpy difference between 2 and 3 of FIG. 5 representing the fresh air intake load for a very humid day. In this example the true load is equivalent to 0.65 tons of refrigeration. On the other hand the total load of the system is related to the enthalpy difference between points 4 and 5 of FIG. 5 and is equivalent to 3.25 tons of refrigeration. In this example the non-true load is equivalent to 3.25−.65 or 2.6 tons of refrigeration. This non-true load could be reduced when the compressor speed (or capacity) is reduced for this operating condition so that the system would meet the true load with a practical minimum of non-true load.

The designer is now in the position to mark on a psychrometric chart the recommended compressor speed for the system meeting the true loads in the most economical manner for any particular operating setting; the designer is also in the position after consulting with the coil manufacturer or determining the surface fin temperature of the direct expansion coil to recommend a minimum allowable temperature (to be maintained by the preheat controller) at the inlet to the direct expansion coil in order to prevent frosting at low refrigerant temperatures. The designer may also establish a minimum temperature (to be maintained by the preheat controller) at the inlet of the direct expansion coil for the purpose of reducing the maximum capacity of the humidifier. These temperatures form the basis of the preheater controller settings and are also to be entered on the psychrometic chart as preset instructions to the operator.

The reheat coil is the exclusive control agent by means of which the desired dry bulb temperature operating condition is maintained within the controlled chamber. The expansion coil operates freely without controllers (except for its thermostatic expansion valve) and has a constant sensible cooling capacity equal to or greater than the summation of all the sensible heat gains to the system. Whenever cooling capacity exceeds the sensible heat gains of the system, the reheat coil controller will modulate to maintain the design setting dry bulb temperature.

The humidifier is the exclusive control agent by means of which the desired dew point temperature or humidity ratio within the controlled chamber is maintained. The expansion coil operates freely without controllers (except for its thermostatic expansion valve) and has a constant dehumidifying capacity equal to or greater than the summation of all the latent heat gains to the system. Whenever dehumidifying capacity exceeds the latent heat gains of the system the humidifier controller will modulate to maintain the design setting dew point temperature or humidity ratio.

An ideal condition is to control humidity ratio settings independent of dry bulb temperature settings. This may be achieved approximately by means of a steam jet humidifier introducing low pressure steam by way of a modulating steam valve, or, as used in this embodiment (where steam was unavailable and where a hard water supply exists) and shown in the drawings, by means of a modulating pan humidifier. This is satisfactory since quick response to start-up is not the most essential feature and once the system reaches equilibrium the load changes will be slow and small, and an accurate control of dew point temperature is therefore possible. The pan humidifier should have an efficiency factor approaching zero in order to minimize the increase in dry bulb temperature accompanying the humidifying process. It may be noted that the efficiency factor is a function of the relative areas of the metal surface of the pan (which delivers sensible heat) and the surface of the water in contact with the air (which delivers latent heat). Thus it is necessary to have a relatively large surface area pan humidifier. Eliminators to prevent carry-over of water may be installed downstream from the humidifier, and these may be constituted by aluminium ducts pitching in the direction of a drain. These are not illustrated in the drawing.

In this embodiment 4% outside air is introduced through the vent 142 provided humidity ratio does not exceed 65 grains of moisture per pound of dry air. In the event however that the humidity ratio does exceed 65 grains of moisture per pound of dry air, the system is arranged to operate on 100% recirculating basis and a $CO_2$ metered supply substitute for the outside air requirement. In a further alternative, advantage can be taken of the fact that when dehumidification is minimal the coil load ratio line has very flat slope settings and as a consequence supply air leaving the direct expansion coil has an excess sensible cooling capacity which can be used to pre-dehumidify the 4% outside air supply. To utilize this alternative a closed air to air cross flow heat exchanger could be introduced. Since however this latter alternative is not likely to be required it is not illustrated in the accompanying drawing and does not form portion of this embodiment.

As said above, a characterizing feature of this invention is that the chamber control means are responsive to true load changes and total loads on the refrigeration system are maintained substantially constant. These control means are both dry bulb temperature and dew point temperature (humidity) control means responsive to the true load changes only. In the past it has been regarded as difficult and expensive to control both humidity and temperature in existing phytotrons and the consensus of opinion of workers in this area has been to limit the use of humidity control. Huge non-true load variations occur due to range requirements; the need may arise to control simultaneously both dry bulb and dew point temperatures (for example if the property of humidity is controlled employing water spray or similar means to add moisture to the mixture). The result is an internal energy interchange causing an inter-action between temperature and humidity controllers, and resulting in large non-true sensible load variations.

The need may also arise to automatically change-over between day and night conditions. Existing systems frequently allow the condenser and evaporator temperatures to vary during an operating setting. High non-true load variations occur in systems which misapply the use of on-off operation of compressors, heaters and humidifiers. Any of the above mentioned reasons can be the source of unnecessarily rapid process rates that exceed the capacity of the control system. Some existing systems try to dampen out these non-true load variations. This is a poor solution. One of the objects of my invention is to reduce the process rate of the system to that of the rate of change of true load only. In doing this, most of the control problems associated with existing systems are eliminated.

I differentiate between the (total) heating and humidifying loads, that is the equivalent of the cooling and dehumidifying loads of the refrigeration system and the actual plant compartment (true) loads due to lights, heat transfer through plant cabinet walls, transpiration and outside air intake, sensible and latent heat loads. Relative to the total system cycle, the internal loads plus the fresh air intake loads of the growth cabinet are very small. The difference between the load and the true load is what is referred to here as the non-true load.

The preheater, reheater and humidifier constitute the control means, and the system used is a combination of proportional control and floating control. The proportional control is related to the slow process reaction rate and the floating control is associated with the gross system responses. The floating control operates only during periods of change of set point, that is, during start-up and change-over between a day and night condition. The floating function is designed into the system to automatically bring in the gross constant control action response required for a particular setting.

Thus in this embodiment I use a hot wire preheater 128 and reheater 131 and also a heater bank 136 for the pan humidifier 135.

A drop (or rise) in temperature through the preheater 128 will be sensed by the thermometer 130 and the preheat control 138 will co-operate with the dry blub tempreature sensor 130 when the temperature departs from the set point (utilizing standard control means) to drive a motor 147 which is coupled to a variable auto transformer 148 to modulate the heat input to a heater wire 149. If the transformer 148 reaches its maximum (or minimum) limit, relay means (not shown) operate progressively each of the contacts 150 to bring into (or take out of) circuit respective fixed heater elements 151 of the bank of elements in the preheater 128, each heater element 151 being smaller than the heater 149 by a fixed difference (in this example ½ kw.), which is greater than the corresponding maximum true load variation that may occur, thus when steady flow state is reached the floating control will never bring in or take out a fixed heater.

In a similar manner the dry bulb sensor 123 controls the motor 154 to therby control the heater bank of the reheater 131, while the dew point sensor 122 controls the motor 155 again in a similar manner to apply further heat to the pan humidifier 136.

Each of these controls is provided with separate night and day setting means which are designated 158 and 159 respectively for the preheater, 160 and 161 respectively for the reheater and 162 and 163 respectively for the dew point control, and all of these are under the control of a time clock programmer switch 141.

Since the details of wiring may be arranged in any one of a number of different ways at the discretion of those skilled in the art, and do not form portion of this invention, (in fact the control system need not be electric) they are not included in FIG. 4 of the drawing. However, in this embodiment I employ time delay means between the respective variable auto transformers and the further heater elements which are brougth into operation when those transformers reach their limits, thereby providing a time delay to permit feed-back. When the system is stopped the floating controller will recycle to its initial position where all fixed heaters are out of the circuit.

The sequences of operation of the electrical and refrigeration portions of the device are as follows:

(1) *Preset.*—The speed of operation of compressor will be obtained from a chart and the compressor will normally operate at the same fixed speed for night and day settings.

The preheat controller will also have its night and day minimum settings determined from a chart, and the preheater will automatically prevent these night and day temperatures upstream of the direct expansion coil from falling below this minimum setting.

The reheat and dew point controllers of course are adjusted to settings which are required by an operator for a particular test, and these again are simply positioned and left in a position for both night and day. Similarly the timer is adjusted to give the programmes of night and day required by the operator for a particular test.

The system operates automatically, but it may if desired be provided with separate manual switch positions for testing purposes (not shown). In addition a manual reset fine adjustment may be provided for the day and night settings of each of the three controllers and these are shown in FIG. 1 alongside the automatic controls designated 158 to 163.

During the day period the timer will operate a relay coil which in turn will operate the switches 167 shown in FIG. 4. These bring in the "day" controller settings and isolate the "night" controller settings (or vice versa). The same switches may be used to switch the lights on and off in the light section 102 for the day and night operating settings respectively.

(2) *Start of system.*—The operator will switch the system on. This will start the supply fan 134.

(3) *Automatic operation of the system.*—When the fan 134 is started, the heaters 128, 131 and 136 are all energized and the heat is adjusted in accordance with the settings as described above. The condenser pump is automatically started, followed by the compressor. The refrigeration effect of the system on the heaters causes the dry bulb and dew point temperatures within the cabinet 101 to fall below or equal the selected set points which have been fixed by the operator. The heater banks are then automatically brought in progressively; first the modulating heater, then if required the fixed heaters until the correct temperature is approximated and the system reaches steady flow state whereupon the modulating motors only respond to the slow process/reaction rate of the true loads only to give narrow band control, the gross system responses associated with start-up and change-over having been met by the floating control as described above.

On a rise in temperature as may occur during changeover from night to day settings (or vice versa) the gross system responses will again be brought into effect if required and the system will progressively take out fixed heaters as described above. However it will be seen that once operating conditions reach equilibrium the variable transformer alone will control each of the three variable heating means.

When comparing the above embodiment with the previously employed phytotrons and other environmental chambers, the lengthy manual control and adjustment to "run in" of the environmental chambers previously employed has been eliminated. Instability of operation of the previous environmental chambers due to hunting and cycling has also been eliminated. The above embodiment has been found to operate to close tolerances, and it will be noted that there is no complex or expensive system of engineering. Change-over of state points from night and day settings can be completely automatic with my system. Furthermore it will be seen that the variations of the total load are reduced to negligible proportions and that the size of the non-true load is reduced to a practical minimum by this system of engineering for a controlled cabinet wherein a narrow band proportional control system is employed on specially selected and arranged air conditioning and refrigeration cycles, as described previously, to be responsive to the true load changes only once the refrigeration system has reached a steady state.

In the event that the system is required for other purposes the concept of the position of the chamber within the system may need revision. Thus for example if a direct expansion coil is to be tested for varying conditions, this may take the place of the coil 129 and the cabinet 100 may be replaced and relocated to be a simple insulated duct extending fore and aft of the coil 129 which is to be tested. The preheater and its controls, the fresh air and spill vents and accessories would no longer be required. A system as described in the above embodiment however could be automatically programmed to change between different preset inlet conditions along the constant compressor speed (see FIG. 3) (or other compressor capacity control means) and with varying set points upstream of the coils 129. As the capacity of the system reaches a minimum or maximum condensing unit capacity a programmer may on say high or low pressure compressor cut out, change to another compressor speed and again repeat the same pattern of programmed inlet conditions as for the original compressor speed setting. Instrumentation measuring air flow and leaving coil dry bulb and dew point temperatures will establish the coil preformance for standard stipulated conditions and also for any desired operating inlet condition within a broad range. When used for rating and testing the direct expansion coil would be installed in a manner which would facilitate quick removal and replacement in accordance with good engineering practice.

On the other hand, usually control chambers used for testing materials or performance of a complete self-contained system such as a fan-coil unit would simply replace the phytotron chamber with one suited for the needs of the test. The dry bulb and dew point sensors would always be located at the point where the gas vapor mixture is controlled. For the testing of heat and mass transfer surfaces the sensors would be located directly upstream of the test surface, with the required instrumentation giving the performance downstream of the test surface.

This invention can combine the use for testing of direct expansion coils for varying entry conditions by controlling the inlet condition to the direct expansion coils as described above with its use for controlling a separate cabinet adapted for testing self-contained units, building materials, electronic equipment all together in one installation. This combination would simply require a procedure of activating only those sensors of the control system in the area being controlled. This combination would serve as a very important tool to scientists and university laboratories. It could not only be material testing and heat transfer surface testing system but could be effectively used for demonstrating the principles of refrigeration and for laboratory experiments in applied thermodynamics.

The invention can be satisfied by the use of devices and components other than described herein. For example, an analogous pneumatic control system is wholly applicable in lieu of the electric control system described in particular. Heating components for the preheat, reheat and humidifying functions may be hot water coils, steam coils, steam jet humidifiers et cetera. It need not be electric as described for the above embodiment.

The specification of the user of this invention with reference to automatic change-over requirements can be very varied in programming, including rising or falling temperature or humidity or compressor capacity. It need not be simply a change-over between day and night conditions as described for a particular embodiment.

The heat exchange surface need not be limited to a finned evaporator coil, but circulation of chilled water or brine to a heat exchange coil may be employed as an adjunct to the evaporation system.

The specifications of the user may allow for a selection of components so that the minimum refrigerant temperature is high enough to avoid frosting and therefore the preheater of the embodiment may be omitted. (For example a very narrow range user's requirement in high temperature and humidity region may result in refrigerant temperatures being high enough to avoid occurrence of frosting.)

The reduction of the non-true load to a practical minimum within the terms of the engineering system of this invention, makes this invention economically feasible for narrow range systems and systems requiring control of temperature only. For example should the user be interested in a temperature-humidity controlled chamber operative in the higher range of humidities, say above 50% relative humidity rather than the wide range within the bordered area of FIG. 2, all other requirements of the user being identical to this embodiment presented herein in detail, a smaller capacity system with lower running costs would result. Inlet condition 1 of FIG. 2 determines the basic for selecting the refrigeration system of this embodiment, the limiting factor in this case to meet the humidifying true load of the system. For this example, where the range of humidities required by the user is above 50% relative humidity inlet condition number 6 of FIG. 2 would determine the basis for selecting the refrigeration system and would have a refrigeration capacity of approximately one fourth of the system described in this embodiment.

The variable element and fixed elements of each bank of heaters are a specific example for this embodiment and the specific user's requirements establishing this embodiment. It is possible to have a user's requirement for a phytotron or for a controlled chamber wherein the tolerances are very broad, wherein less sensitivity controllers may warrant, due to the slow rate of true load change, to use on-off control. For example if the controllers have a sensitivity which will result in a response only after, say, a $\pm\frac{3}{4}°$ F. change has occurred in the cabinet and if the change in true load is such that a rise or fall of $\frac{3}{4}°$ F. would not occur for at least one hour, the use of a variable element would not be necessary and a more economical solution using an on-off controllers would operate every hour or more to respond to the slow change of true load.

What I claim is:

1. An environment system controlling heat level of an environmental space which contains both sensible and latent heat, a closed, steady flow refrigeration system of the vapor compression type having an evaporator unit and a compressor, said compressor including means for being operated continuously and at a constant speed when the system is being used for maintaining an environment to a preset level of at least one of the sensible heat portions or the latent heat portion of its total heat level, a chamber which defines the environmental space to be controlled, a gas/vapor circulating system for flowing gas/vapor in the system over a heat exchange surface of the evaporator unit and through said chamber, and including a fan means to move gas/vapor through said circulating gas/vapor system and over said heat exchange surface at a steady flow rate, heating means positioned external to the space defined by said chamber and in a path of flow of said circulating gas/vapor system, adjustable control means operatively associated with said chamber responsive solely to true load changes which consist of variations in at least one of the sensible heat levels or latent heat level in said chamber, said control means being operable independently of said refrigeration system to control at least one of said heat portions to any one of a plurality of presettable desired values, by the controlled addition of heat from said heating means to the circulating gas/vapor so that environmental conditions for the chamber are detected and maintained without any adjustment of said steady flow refrigeration system, the total load on the refrigeration system and the temperature of the refrigerant in the evaporator for any given set point being independent of the variation of the true loads on the system, and the total load on the refrigeration system and the temperature of the refrigerant in the evaporator being a constant value that is a function of the location of the set point within the range.

2. The improvement according to claim 1 wherein the heating means include a preheater disposed upstream of the cooling heat exchange surface.

3. A controlled chamber according to claim 2 wherein the evaporator is of such capacity that the heat exchange surface dehumidifies the gas/vapor mixture when passing it to a moisture content equal to or less than the moisture control set point of the chamber.

4. A controlled chamber according to claim 3 wherein the cooling and dehumidifying, and the heating and humidifying surfaces are of minimum capacity for the range of set points within the psychometric limits of operation.

5. A controlled chamber according to claim 3 further including a reheater disposed downstream of the cooling heat exchange surface, the reheater constituting temperature control means by which dry bulb temperature operating conditions are maintained over a range of dry bulb temperatures.

6. A controlled chamber according to claim 3 further including a humidifier disposed downstream of the cooling heat exchange surface, the humidifier constituting humidity control means by which the dew point temperature (humidity ratio) operating conditions are maintained over a range of dew point temperatures.

7. A controlled chamber according to claim 3 further including a preheater disposed upstream of the cooled heat exchange surface, the preheater being of sufficient capacity to supply sufficient temperature to the gas/vapor mixture to avoid frosting.

8. A controlled chamber according to claim 2 wherein the chamber is defined by the walls of a cabinet, a plenum in the base of the cabinet and a register in the side walls near the top of the cabinet, the upper portion of the plenum being defined by at least one perforated plate, the gas, vapor or gas/vapor mixture entering the cabinet through the plenum and leaving the cabinet from the register.

9. The improvement according to claim 5 wherein the gas/vapor mixture has a constant volume flow rate; the gas/vapor mixture inlet state to the cooling heat exchange surface, the refrigeration system condensing temperature, the refrigerant temperature, and the reheated gas/vapor mixture downstream of the evaporator does not vary during any one operating setting; the compressor of the condensing unit is arranged to run continuously; all the gas/vapor mixture circulates past the cooling heat exchange surface, a thermostatic expansion valve exists in the refrigeration system and constitutes the only automatic controller on the operation of the refrigeration cycle; and a uniform air flow pattern passes through the chamber.

10. The improvement according to claim 1 wherein sensible and latent heat levels for said chamber are separately controlled and maintained, and including separate sensors and separate control means for detecting and adjusting temperature and humidity.

11. A controlled chamber comprising a cabinet means and an air conditioning unit provided with a fan arranged to continuously circulate a gas/vapor mixture through the cabinet means, a humidifier in the path of gas/vapor flow, a reheater also in said path, the air conditioning unit having a vapor compression type of refrigeration system including an evaporator coil which is disposed to intersect the gas/vapor mixture being circulated through the cabinet means, the evaporator coil being upstream of the reheater, a preheater upstream of the evaporator, a dry bulb temperature sensing element disposed in the path of gas/vapor flow between the preheater and the evaporator to thereby sense the temperature of the gas/vapor mixture downstream of the preheater, preheater control means coupled to the dry bulb temperature sensing element to thereby regulate the temperature of the gas/vapor mixture downstream of the preheater, reheat control means adjustable over a wide range of control set points to set a temperature condition to be maintained in said cabinet, a dry bulb temperature sensor operatively associated with the controlled cabinet means and coupled to the reheat control means, a reheater controlled by the reheat control means to thereby control dry bulb temperature within the cabinet means, a dew point sensor operatively associated with the cabinet means, and dew point control means coupled to the dew point sensor to thereby control the dew point temperature within the cabinet means, said dew point control means being adjustable over a range of control set points.

12. A controlled chamber according to claim 11 further comprising a motor driven variable transformer, the preheater, the reheater and the humidifier each comprising a bank of electrically heated conductors, each bank of electrically heated conductors being provided with at least one element controlled by the motor driven variable transformer.

13. A controlled chamber according to claim 12 further comprising a plurality of switches, each bank of electrically heated conductors including sections which are controlled by the switches thereby being placed progressively into or out of circuit after the transformer of the respective bank is driven to its upper or lower voltage limit respectively.

14. A controlled chamber according to claim 11 wherein the refrigeration system includes a compressor, the compressor being arranged to run continuously.

15. A controlled chamber according to claim 13 further comprising clock programming means, the preheat control means, reheat control means and dew point control means each having day and night settings, the clock programming means selecting their day and night set points consecutively.

16. A controlled chamber according to claim 15 further comprising an air plenum across the lower portion of said cabinet and a light section containing one or a plurality of lamps across its upper portion.

17. A controlled chamber according to claim 11 further comprising an air inlet valve disposed upstream of the heater means and a manual spill damper disposed downstream of the fan.

18. A process for separately controlling temperature and humidity conditions, in an enclosed environment which allows a simulation of conditions such as climatic, plant growing conditions over wide ranges, comprising the steps of:

continuously circulating a gas/vapor mixture through an enclosed environment, and simultaneously intersecting the gas/vapor flow at an evaporator unit of a continuously operating vapor compression type of refrigeration system in a manner such that during start-up of the total system and during change-over the gas/vapor and the refrigeration flow systems naturally and automatically will be moving towards and reaching a steady flow state wherein the total load on the refrigeration system and the temperature of the refrigerant in the evaporator for any given set point will be independent of the variations of the true loads on the system, whereby following the establishing of steady flow conditions for the gas/vapor and refrigerant paths across the evaporator, the system arrangement and preselection will result in a cooling of the gas/vapor passing through the evaporator to a level which is sufficiently low to anticipate all sensible heat gains of the system and which, at the same time, will result in a dehumidifying of the gas/vapor passing through the evaporator unit to a level which is sufficient to anticipate all latent heat gains of the system, thereupon maintaining a set dry bulb temperature in the enclosed environment by controlling only a reheating means which intersects the gas/vapor flow and which is responsive only to true load variations in the sensible heat load, and simultaneously maintaining a set humidity in the enclosed environment by controlling only a humidifier which intersects the gas/vapor flow and which is responsive only to true load variations in the latent heat load.

19. A process for controlling heat load in an environment to any one of a plurality of preset conditions by controlling at least one of the sensible heat portion and the latent heat portion of the total heat level of a chamber to allow a simulation of conditions such as climatic, plant growing conditions over wide ranges, comprising the steps of:

continuously circulating a gas/vapor mixture through an enclosed environment, and simultaneously intersecting the gas/vapor flow at an evaporator unit of a continuously operating vapor compression type of refrigeration system in a manner such that during start-up of the total system and during change-over the gas/vapor and the refrigeration flow systems naturally and automatically will be moving towards and reaching a steady flow state wherein the total load on the refrigeration system and the temperature of the refrigerant in the evaporator for any given set point will be independent of the variations of the true loads on the system, whereby following the establishing of steady flow conditions for the gas/vapor and refrigerant paths across the evaporator, the system arrangement and preselection will result in a reduction of the energy level of the gas/vapor passing through the evaporation to a level which is sufficiently low to anticipate all heat gains for at least that portion of the total heat level which it is desired to control, said heat level being at least one of the sensible heat portion and the latent heat portion, thereupon maintaining at least one of the following:

(1) a set sensible heat level in the enclosed environment by controlling heating means which intersect the gas/vapor flow and which is responsive only to the load variations in the sensible heat load, or (2) a set latent heat level in the enclosed environment by controlling a humidifying means which intersects the gas/vapor flow and which is responsive only to true load variations in the latent heat load.

References Cited
UNITED STATES PATENTS

| | | | |
|---|---|---|---|
| 2,300,092 | 10/1942 | Baum | 236—68 |
| 2,941,404 | 12/1954 | Woods. | |
| 2,144,693 | 1/1939 | Seid | 165—21 XR |
| 2,191,208 | 2/1940 | Woodling | 165—21 XR |
| 2,218,468 | 10/1940 | Haines | 165—21 XR |
| 2,544,544 | 3/1951 | Qualley et al. | 165—21 XR |
| 3,181,791 | 5/1965 | Axelrod | 236—44 |
| 3,257,816 | 6/1966 | Parce | 165—21 XR |

FRED C. MATTERN, Jr., Primary Examiner

MANUEL ANTONAKAS, Assistant Examiner

U.S. Cl. X.R.

236—44